Dec. 5, 1944.  J. G. LEWIS  2,364,082
MAP MAKING FROM AERIAL PHOTOGRAPHS
Filed March 1, 1944  3 Sheets-Sheet 1

INVENTOR
JAMES G. LEWIS
BY
*J. B. Mothershead*
ATTORNEY

Dec. 5, 1944.  J. G. LEWIS  2,364,082
MAP MAKING FROM AERIAL PHOTOGRAPHS
Filed March 1, 1944   3 Sheets-Sheet 2

INVENTOR
JAMES G. LEWIS
BY
ATTORNEY

Dec. 5, 1944.   J. G. LEWIS   2,364,082
MAP MAKING FROM AERIAL PHOTOGRAPHS
Filed March 1, 1944   3 Sheets-Sheet 3

INVENTOR
BY  JAMES G. LEWIS
ATTORNEY

Patented Dec. 5, 1944

2,364,082

UNITED STATES PATENT OFFICE 2,364,082

MAP MAKING FROM AERIAL PHOTOGRAPHS

James G. Lewis, Falls Church, Va.

Application March 1, 1944, Serial No. 524,567

5 Claims. (Cl. 33—1)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to map-making from aerial photographs, and more particularly to photogrammetric instruments for the rectification of nadir radials in oblique aerial photographs.

Heretofore, in the plotting of planimetric maps from tilted or oblique aerial photographs it has been customary to determine analytically the orthographic projection in a horizontal ground plane of angles made by laying out radials from the photograph nadir by virtue of the known relationship $$\text{Tan } \theta' = \frac{\text{Tan } \theta}{\cos i}$$

where $\theta$ is any angle in the photograph plane described by a pair of radials intersecting at the photograph nadir
$i$ is the angular tilt of the oblique photograph, and
$\theta'$ is the angle described in a horizontal ground plane by the orthographic projection of $\theta$.

By radial triangulation of rectified nadir radials thus calculated, employing common ground points imaged on an overlapping pair of oblique aerial photographs, suitably oriented, a planimetric map can be constructed. Obviously, the rectification by trigonometric calculation of numerous nadir radials is a tedious procedure, and in U. S. Patent No. 2,321,033, issued June 8, 1943, to J. G. Lewis, a device for the mechanical plotting of rectified radials is described. A simplified instrument for the rectification of nadir radials which requires only an initial orientation and a single adjustment for the tilt angle would be very desirable.

Accordingly, this invention has as an object the provision of a simple device for the mechanical plotting of rectified nadir radials from an oblique aerial photograph. A more specific object is to provide a simple device for the orthographic projection of angles in the plane of an oblique aerial photograph onto a horizontal ground plane. Another object is to provide a mechanical instrument useful for the plotting of planimetric maps by radial triangulation from an overlapping pair of oblique aerial photographs.

Other and related objects will be apparent or will appear hereinafter.

The foregoing and other objects of the invention and the details of an embodiment thereof will become apparent from the following specification and accompanying drawings, in which.

In one preferred embodiment, the instrument for accomplishing the objects and purposes above indicated comprises a support which may be an ordinary drawing board, a base arm hinged thereto and having a longitudinal guide therein, a centering stud near one end of the base arm, a generally L-shaped sensing member supported by the centering stud for pivotal movement coaxial therewith, graduations on one leg of the sensing member and longitudinal guide means on the other leg of the sensing member, elongated indicating element supported by said centering stud and a longitudinally slotted link connecting the base arm with the indicating element and the sensing member in definite fashion for translating proportionately an angular displacement of the sensing member to the indicating element. In use, the sensing member is positioned over the oblique aerial photograph and oriented relative thereto along the principal line, the centering stud is oriented over the photograph nadir point, and the indicating element is oriented over a mapping sheet for projecting a rectified nadir radial thereon.

Figure 4:
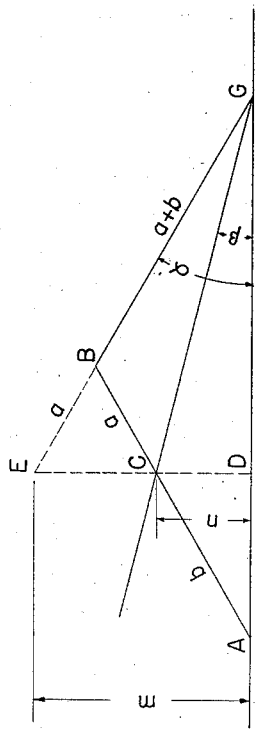
Fig. 4 is a graphical plot of the linkage arrangement employed in the device illustrated in Figs. 1, 2 and 3.

Before describing the details of construction of my preferred embodiment and in order to explain the purpose, theory or method of operation and function of my invention, reference is made to the graphical layout of Fig. 4 which is a representation of the mechanical linkage employed in my preferred embodiment for solving the above-mentioned equation, $$\text{Tan } \theta' = \frac{\text{Tan } \theta}{\cos i}$$

This fundamental relationship can be expressed thus:

> The Tangent of the angle, as measured at the photograph nadir point, in the plane of an oblique photograph, divided by the cosine of the tilt angle equals the tangent of the angle formed in a horizontal or ground plane by the orthographic projection of the corresponding angle in the photograph.
>
> Since the tilt angle of any one oblique photograph is constant, and can be determined by measurements on the photograph itself, and the angle in the photograph itself can be likewise measured, the rectified angle formed by orthographic projection into a horizontal plane can readily be computed. Therefore, any mechanical linkage which will solve the above equation will mechanically rectify nadir radials.

In the graphical plot shown in Fig. 4, by construction, $AB = BG$
C is any point on line AB
CD is perpendicular to AG at D and when extended meets BG extended at E.

For convenience, the following symbols will be substituted for their equals:

$a = CB$
$b = AC$
$m = ED$
$n = CD$
$B =$ Angle $AGC$
$\alpha' =$ Angle $AGB$
$DG = X$ Referring to Figure 4

$$\tan \alpha' = \frac{m}{x} \text{ and } x = \frac{m}{\tan \alpha'}$$

$$\tan B = \frac{n}{x} \text{ and } x = \frac{n}{\tan B}$$

Therefore $$\frac{m}{\tan \alpha'} = \frac{n}{\tan B} \text{ and } \frac{\tan \alpha'}{\tan B} = \frac{m}{n} \text{ or } \frac{\tan B}{\tan \alpha'} = \frac{n}{m}$$

If it can be shown that the ratio $$\frac{n}{m}$$

is dependent only on the position of point C along the line AB and a relationship between the two found, and if the ratio $$\frac{n}{m}$$

is found to be constant for any values of $\alpha'$ and B then the principle will solve an equation $$\frac{\tan B}{\tan \alpha'} = \sin \phi$$

for any value of $\alpha'$, B and $\phi$. For example, $\alpha'$ and $\phi$ can be any arbitrarily chosen angles; then the graphical proof to follow and a mechanical linkage based thereon will determine a value for an angle $\beta$.

These facts are proven in the following steps:

$AB = BG$ and $\alpha' =$ angle $BAG$ by construction.
$\sin \angle BAG = \frac{n}{b} = \sin \alpha'$ $\sin \alpha' = \frac{m}{EG}$; $BG = AB = a + b$ $EG = EB + BG = EB + a + b$
Angle $ACD =$ Angle $ECB$
In triangle ACD, Angle $ACD = (90 -$ angle $BAG) = (90 - \alpha')$
In triangle EDG, angle $DEG = (90 - \alpha')$
Therefore angle $ACD =$ angle $DEG =$ angle $ECB$
and $CB = EB = a$
And it follows that $EG = a + a + b = 2a + b$
In triangle EDG, $$\sin \alpha' = \frac{m}{2a+b} = \frac{n}{b}; \text{ thus } \frac{n}{m} = \frac{b}{2a+b} = \sin \phi = \frac{\tan B}{\tan \alpha'}$$

This last relationship illustrates the fact that a linkage can be built which will solve a relationship for a sine function of an angle, and since the sine of one acute angle in a right triangle is equal to the cosine of its complementary angle it is apparent that the mechanical linkage built upon the graphical solution above outlined will solve the basic equation, $$\tan \theta' = \frac{\tan \theta}{\cos i}$$

which can be trigonometrically transposed to read $$\sin (90° - i) = \frac{\tan \theta}{\tan \theta'}$$

Thus it can be seen that the relationship soluble by the mechanical linkage, in terms, is the same relationship which must be applied to the solution of oblique aerial photographs, it only being necessary to substitute $\theta$ for $\beta$, $\theta'$ for $\alpha'$ and to make the true depression angle, $90° - i$, equal to $\phi$. In the above solution $\phi$ is the true depression angle of the aerial photograph. Applying the graphical plot to the solution of oblique aerial photographs, the point G corresponds to the photograph nadir point and line AG to the "principal line." When the line CG, extended if necessary, is aligned on a photographic image the line BG will be the projection of line CG on some inclined plane, the inclination of the plane of projection being governed by the position of C along AB. In order to obtain a true projection onto a horizontal plane it is necessary to set the position of C so as to satisfy the relation $$\frac{b}{2a+b} = \sin \phi$$

The correct setting for C can be made for any value of $\phi$.

As shown by the foregoing, an instrument including the above described mechanical linkage will be satisfactory.

Figure 1:
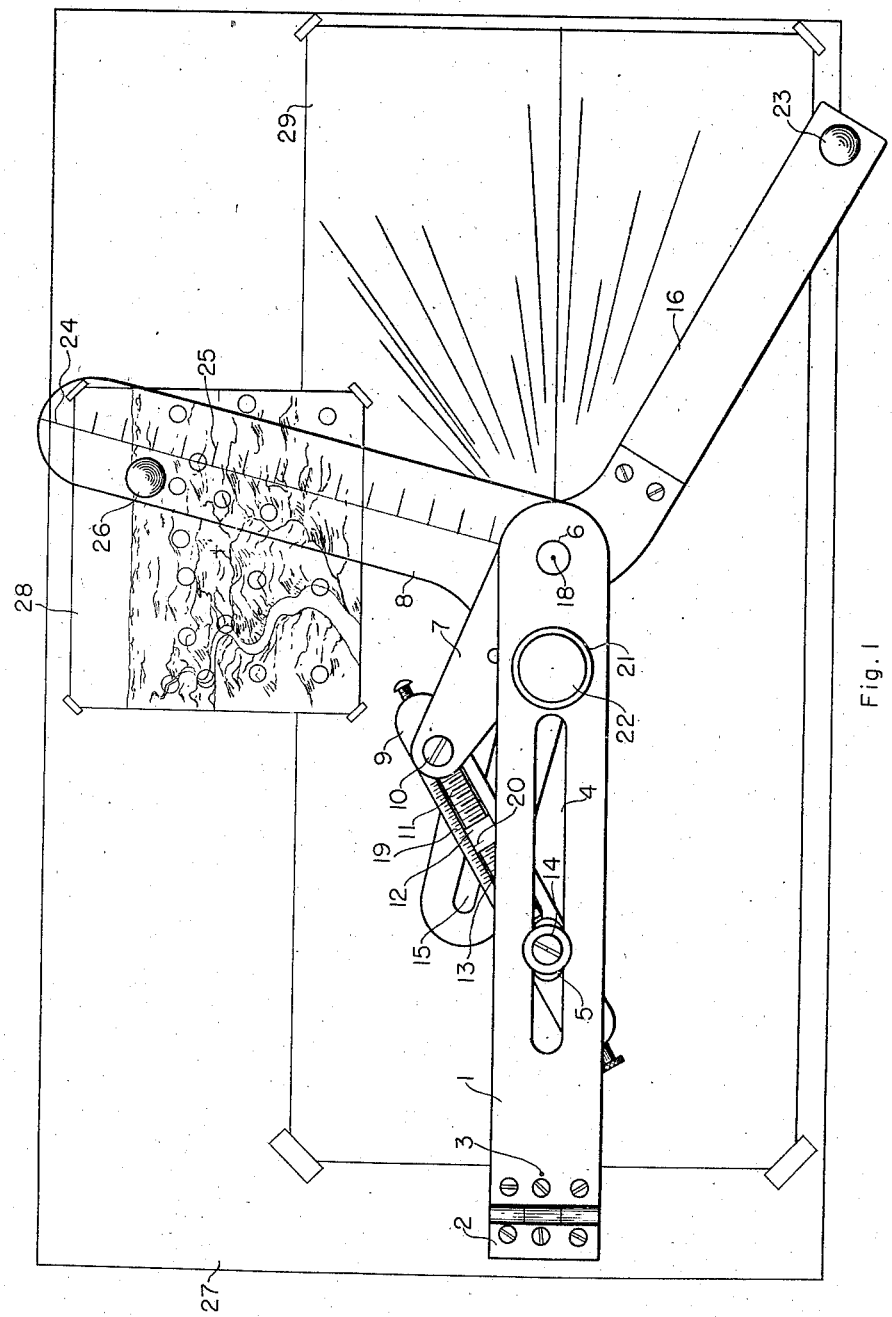
Fig. 1 is a plan view of a preferred embodiment of my device showing an oblique aerial photograph and a mapping sheet supported in oriented position relative to a sensing member and an indicating element.
Figure 2:
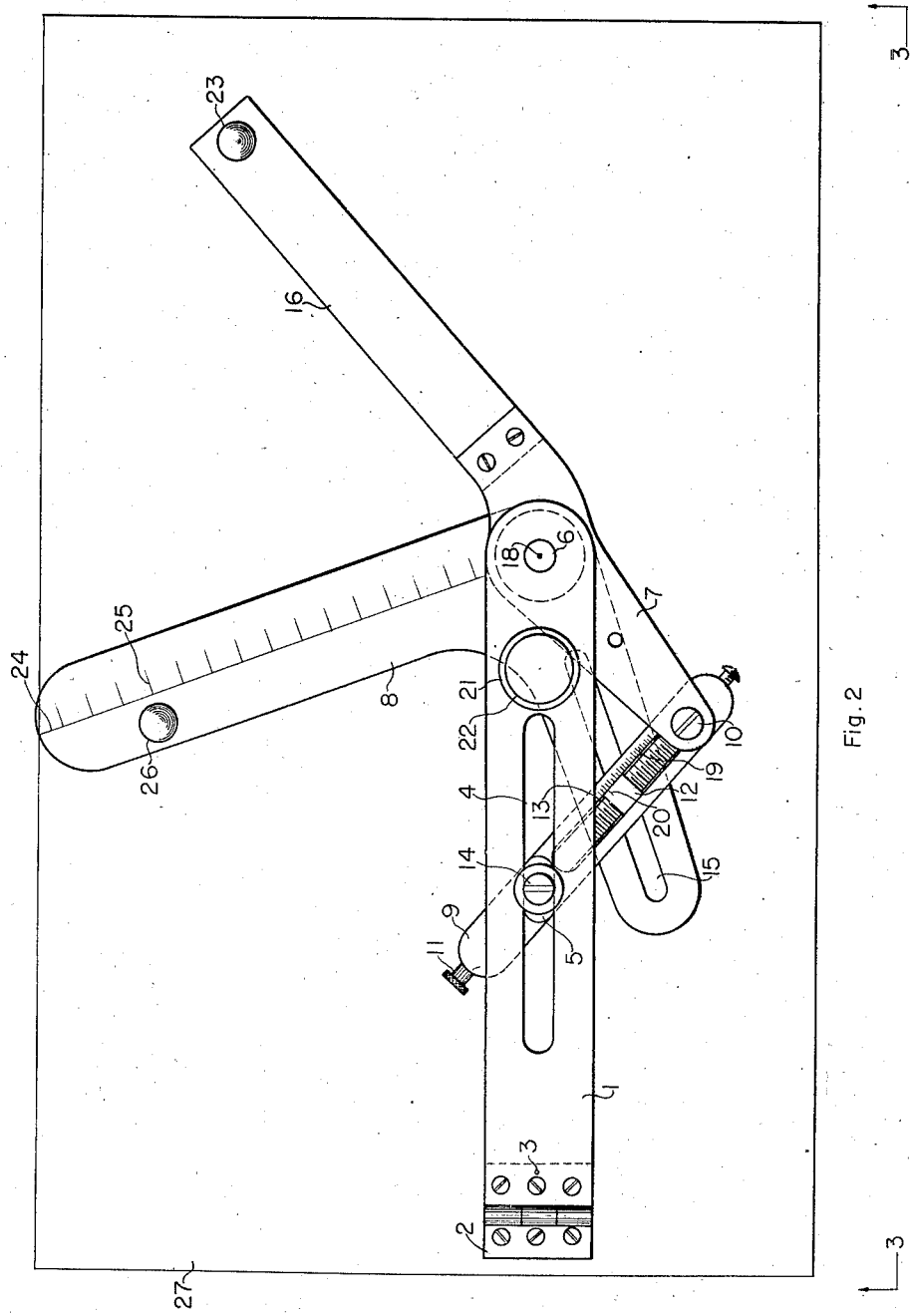
Fig. 2 is another plan view of my device, which shows the sensing member and the indicating element in a different position than in Fig. 1.
Figure 3:
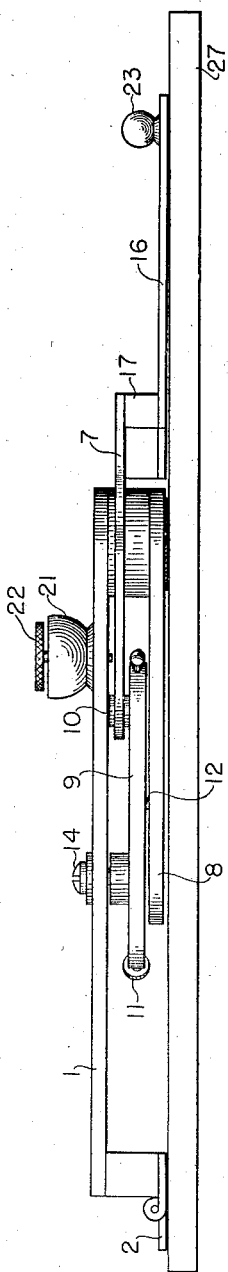
Fig. 3 is an elevation of the device taken along the line 3—3 of Fig. 2 in the direction indicated by the arrows.

For a practical embodiment of the invention, and referring now to Figures 1, 2 and 3, a supporting base 27 is provided which holds an oblique aerial photograph 28 and a mapping sheet 29 in displaced coplanar relationship. A base arm 1 is provided at one end with a hinge 2 and a pin hole 3 for fastening to a table or other supporting means. The base arm contains a longitudinal slot or guideway 4 along which a pivot slide 5 is free to move. A centering stud 6 is rigidly fastened into one end of the base arm 1 and acts as a bearing for the sensing member 8 and the indicating element 7. A link 9 is connected by a pivot 10 to the indicating element 7 and carries a ratio pin screw 11 which serves to adjust the ratio pin 12 to any position along the channel or slot 13 longitudinally cut in the link 9. The opposite end of the link 9 contains a pivot 14 which engages and is free to rotate in a hole drilled in a pivot slide 5. The ratio pin 12 engages a slot or channel 15 in one leg of the sensing member 8 which lies upon the support 27 over the photograph 28 and is oriented relative thereto as more particularly explained hereinafter. The ruling arm 16 forming an extension of the indicating element 7 lies upon the mapping sheet 29 and is connected through the remainder of the indicating element 7 by means of a counter balance 17 and rotates about the centering stud 6. The centering stud 6 is provided with a metal hole 18 which preferably cooperatively engages an insert not shown in the support 27.

The link 9 is marked off into graduations 19 in degrees of tilt, which are used in conjunction with the index mark 20 on the ratio pin slide 12 for setting the instrument in accordance with the measured tilt value of the oblique aerial photograph. The base arm 1 is provided with a lifting knob 21 containing a locking screw 22 for lifting the instrument, and locking the indicating element 7 to the base arm 1. With the locking screw 22, the pivot 10 the centering stud 6 and the ruling edge 16 of the indicating element 7 can be made to lie in a straight line, thus permitting calibration of the instrument. The ruling arm 16 carrying the knob 23 is constructed so that the ruling edge is in alignment with the axis of the centering stud 6.

The sensing member 8 is preferably constructed of transparent material and is provided with a longitudinal hair line 24 on the under side thereof, which passes through and is in alignment with the axis of the centering stud 6. The sensing member 8 also contains graduations 25 perpendicular to the hair line 24 laid off in inches measured from the axis of centering stud 6. A knob 26 is attached to the sensing member 8 for purposes of movement.

The indicating element 7 and the link 9 are so constructed that the distance between the pivot 14 and the pivot 10 is equal to the distance between the pivot 10 and the centering stud 6. The slot or channel 15 in the sensing member 8 transmits an angular movement of the sensing member 8 through the link 9 bearing on the base arm 1 to the indicating element 7 in accordance with the setting of the ratio pin slide 20.

In operation, the principal point, principal line and the position of the photograph nadir are first determined by conventional means and the length of the principal line between the principal point and the photograph nadir is likewise conventionally determined. A mapping sheet 29 is then inserted and taped in position under the indicating element 7 after raising the instrument about the hinge 2. The instrument is then lowered into position. The photograph is then oriented relative to the instrument by aligning the longitudinal line 24 over the principal line of the photograph 28 and the principal point is positioned relative to the scale 25 so that the photograph nadir falls under the pin hole 18 located at the axis of centering stud 6. Before rectified nadir radials can be projected by the instrument for any one photograph, the ratio pin screw 11 is turned until the index mark 20 on the ratio pin 12 is set opposite the correct graduation 19 corresponding to the tilt of the photograph under consideration. The instrument is now in adjustment and ready to operate. With the guide line 24 over the principal line of the photograph 28 the ruling edge 16 of the indicating element 7 describes a reference line which can be drawn on the mapping sheet 29. Both the photograph and the mapping sheet are now taped to the support 27 and nadir radials aligned with the sensing element 24 can be rectified and traced on the mapping sheet by means of the indicating element 7. The knob 23 or the knob 26 is used to rotate the sensing member 8 until the hair line 24 is directly over a selected image point on the photograph, and then a line is drawn on the mapping sheet along the ruling edge 16 of the indicating element 7. Any number of such radials are then taken to selected reference points on the photograph and the indicating element projects the corresponding rectified ground nadir radials.

Where two oblique photographs on opposite sides of the line of flight are simultaneously made during an aerial survey, as is the case with a multilens aerial surveying camera, the photograph previously employed can be removed, the mapping sheet detached and rotated 180 degrees around the centering stud, again fixed in position, the opposite photograph again oriented as previously described, the instrument adjusted for the new tilt angle, and the opposite nadir radials to the opposite selected reference points can be projected in similar fashion, on the same mapping sheet.

Where common points on an overlapping pair of photographs are employed as reference points, a pair of transparent mapping sheets can be oriented relative to the line of flight, in known fashion, and the common points plotted on the two mapping sheets are shown at the intersection of the rectified nadir radials.

Since many apparently different embodiments of the invention will occur to one skilled in the art, various changes can be made in the preferred embodiments as illustrated and described without departing from the spirit and scope of the invention.

What is claimed is:

1. In a photogrammetric instrument for the rectification of nadir radials from oblique aerial photographs, the combination of means for supporting an oblique aerial photograph and a mapping sheet in laterally-displaced plane-parallel relationship with a centering device whose axis is normal to the plane in which said photograph and mapping sheet are supported, means including a longitudinal guide-way for supporting said centering device relative to said photograph support while permitting it to be raised away therefrom; a sensing member supported by said centering device for pivotal movement coaxial therewith, said sensing member having a longitudinal guideway thereon radially displaced from said centering device; means including an index line and gradations carried by said member for orienting said member over the photograph relative thereto, an indicating element supported by said centering device for pivotal movement coaxial therewith, said element being adapted for orientation over said mapping sheet and relative thereto, a longitudinally slotted link having pivotal engagement with said element and sliding pivotal engagement with said supporting guide-way, the length of said link being equal to the distance along said element between its link connection and the centering device, a guide pin in sliding engagement with said link slot and said member guide-way, and means for at will varying the position of said guide pin relative to said link.

2. A photogrammetric instrument for the rectification of nadir radials from an oblique aerial photograph which comprises means for supporting an oblique aerial photograph and a mapping sheet in laterally displaced coplanar relationship, a centering stud normal to the plane of said mapping sheet, means including a longitudinal guideway for supporting said centering stud relative to said photograph support while permitting it to be raised out of position; a sensing member having a pair of legs supported by said stud for pivotal movement about an axis at the apex of said legs coaxial with said stud; a longitudinal guide-way on one leg of said member, means for orienting said member over the photograph relative thereto and said stud over the photograph nadir; an elongated indicating element supported intermediate its ends by said stud for pivotal movement coaxial with said stud and said member, said element being adapted for orientation over said mapping sheet and relative thereto; a link pivotally connected near one of its ends to said element near one end thereof, a longitudinal guide-way on said link, means providing a pivotal connection near the second end of said link in sliding engagement with the guide-way in said stud supporting means, the length of said link between its terminal pivotal connections being equal to the length of said element between said stud and said link connection, means providing a guide pin connection between said link and said member adapted to slide in said link guide-way and said member guide-way, and means for at will locking said guide pin connection relative to said link.

3. A photogrammetric instrument for the rectification of nadir radials from an oblique aerial photograph which comprises means for supporting an oblique aerial photograph and a mapping sheet in laterally displaced plane-parallel relationship, a base arm including longitudinal guide means parallel to the supporting means, means cooperating with said photograph supporting means for maintaining said base arm in parallel position while permitting it to be raised out of parallel position, stud means adjacent one end of said base arm normal thereto and, in the lowered arm position, normal to said photograph supporting means; a generally L-shaped member supported by said stud means for pivotal movement about an axis at the apex of said member coaxial with said stud means, longitudinal guide means on one leg of said member, means for orienting said member over the photograph relative thereto, and said stud means over the photograph nadir; an elongated indicating element supported intermediate its ends by said stud means for pivotal movement coaxial with said member and said stud means, said element being adapted for orientation over said mapping sheet and relative thereto; a link pivotally connected near one of its ends to one end of said element, and longitudinal guide means on said link, means providing a pivotal connection near a second end of said link in sliding engagement with said longitudinal guide means on said base arm, the distance along said link between its pivotal engagement with said base arm and said element bearing a definite relationship to the distance along said element between its link engagement and said stud means, means including a guide pin providing sliding engagement with both the longitudinal guide means in said member and in said link and means for at will locking said guide pin in a predetermined position relative to said link, whereby in operation a nadir radial sensed by said member is rectified and projected by said element when the setting of said guide pin along said link is made relative to the true depression angle of the aerial photograph.

4. A photogrammetric instrument for the rectification of nadir radials from an oblique aerial photograph which comprises supporting means for maintaining an oblique aerial photograph and a mapping sheet in laterally-displaced plane-parallel relationship, a base arm parallel to the plane of said photograph supporting means, means adjacent one end of said base arm for maintaining said base arm in parallel position while permitting it to be raised away from and lowered parallel to said photograph plane; centering stud means adjacent the second end of said base arm and, in the lowered arm position, normal to the plane of said photograph; longitudinal guide means on said base arm radially displaced from said stud means, a generally L-shaped sensing member supported by said centering stud means for pivotal movement about an axis at the apex of said member coaxial with the centering stud means, means for orienting one leg of said member over said photograph relative thereto and said centering stud means over the photograph nadir, longitudinal guide means on the second leg of said member radially displaced from said stud means; an elongated indicating element supported intermediate its ends by said stud means for pivotal movement coaxial with said member and said stud means, one arm of said element being adapted for orientation about its axis over the mapping sheet and relative thereto whereby a rectified nadir radial is described by said arm, the second arm of said element being provided with a connecting pin having an axis parallel to the stud means axis and located a predetermined distance therefrom; a link having near one end thereof, pivotal engagement with said connecting pin and carrying a second pin near the second end thereof having sliding engagement with said base arm guide means, the distance along said link between said connecting pin and said second pin bearing a definite relationship to the distance along said element between said connecting pin and said stud means, longitudinal guide means forming a part of said member guide means; and means for at will varying and maintaining the radial displacement of said guide pin from said connecting pin whereby an angular displacement imparted to said sensing member is proportionately imparted through said guide pin and link to said indicating element.

5. A photogrammetric instrument for the rectification of nadir radials from an oblique aerial photograph which comprises a support providing a plane-supporting surface for maintaining an oblique aerial photograph and a mapping sheet in laterally displaced coplanar relationship, a longitudinally-slotted base arm parallel to but displaced from said supporting surface, means providing a hinged connection between one end of said base arm and said support whereby said base arm may be raised in pivotal movement about an axis parallel to the plane supporting surface; a centering stud carried by said base arm radially displaced from said hinged connection and, in the lowered arm position, normal to the plane supporting surface, an L-shaped member supported by said centering stud for pivotal movement about an axis at the apex of said member coaxial with the centering stud axis, one leg of said member having a longitudinal index line aligned with the axis of said centering stud and graduations perpendicular to said index line, said index line and graduations being adapted for orienting said member over said photograph relative thereto and said centering stud over the photograph nadir, the second leg of said member being at right angles to said index leg and being provided with a longitudinal slot radially displaced from said centering stud; an elongated indicating element supported intermediate its ends by said centering stud for pivotal movement coaxial with said member and said centering stud, one arm of said element having a ruling edge in alignment with said element axis and being adapted for orientation about its axis over the mapping sheet and relative thereto, the second arm of said element being provided with a connecting pin; a link pivotally engaging near one end thereof said connecting pin and carrying a second pin near the second end thereof having sliding engagement with the slot in said base arm, the length of said link between said connecting pin and said second pin being equal to the length of said element between said connecting pin and said centering stud, said link having a longitudinal slot therein and graduations on said link adjacent its slot, a guide pin mounted in sliding engagement with said link slot, the axis of the guide pin being parallel to the axis of said centering stud, said guide-pin extending from said slot and having sliding engagement with the slot in the second leg of said member, and means for at will varying and maintaining the radial displacement of said guide pin from said connecting pin.

JAMES G. LEWIS.